United States Patent [19]

Shinabe

[11] Patent Number: 4,872,059
[45] Date of Patent: Oct. 3, 1989

[54] SYSTEM FOR DRIVING A LIQUID CRYSTAL DISPLAY PANEL

[75] Inventor: Munehiro Shinabe, Tokorozawa, Japan

[73] Assignee: Citizen Watch Co., Ltd., Tokyo, Japan

[21] Appl. No.: 222,397

[22] Filed: Jul. 19, 1988

Related U.S. Application Data

[63] Continuation-in-part of Ser. No. 12,086, Feb. 6, 1987, abandoned.

[30] Foreign Application Priority Data

Feb. 7, 1986 [JP] Japan .................. 61-025592

[51] Int. Cl.$^4$ ............................. H04N 5/70
[52] U.S. Cl. ................... 358/241; 358/236; 340/784
[58] Field of Search ............ 358/236, 241; 340/784, 340/793

[56] References Cited

U.S. PATENT DOCUMENTS

| | | | |
|---|---|---|---|
| 4,158,860 | 6/1979 | Irie | 358/236 |
| 4,193,095 | 3/1980 | Mizushima | 358/241 |
| 4,234,821 | 11/1980 | Kako | 358/241 |
| 4,591,902 | 3/1986 | Masubuchi | 358/236 |
| 4,602,292 | 7/1986 | Togashi | 358/236 |
| 4,630,122 | 12/1986 | Morokawa | 358/241 |

Primary Examiner—Tommy P. Chin
Attorney, Agent, or Firm—Birch, Stewart, Kolasch & Birch

[57] ABSTRACT

First and second driving pulses, which are different in shape, are alternately applied to each pixel of a liquid crystal matrix display panel. Each driving pulse comprises a high voltage portion and a low voltage portion. By changing the width of the high voltage portion, a half tone is obtained in a picture. The high voltage portion of the first driving pulse is formed along a leading edge of the pulse, and the high voltage portion of the second driving pulse is formed along a trailing edge of the pulse to offset capacitance noise caused by capacitive connections between data and scanning electrodes of the display panel.

3 Claims, 12 Drawing Sheets

4,872,059

SYSTEM FOR DRIVING A LIQUID CRYSTAL DISPLAY PANEL

This application is a continuation-in-part of application Ser. No. 012,086 filed on Feb. 6, 1987, now abandoned.

BACKGROUND OF THE INVENTION

The present invention relates to a system for driving a liquid crystal matrix display panel, and more particularly to a system for driving the display panel so as to reproduce an image with a gray scale.

In a television with a passive matrix liquid crystal display panel each pixel of which does not contain an active element, the display panel is driven to produce pictures with a gray scale using an amplitude selection method.

Explaining a conventional driving system with reference to FIG. 2 showing a driving voltage waveform applied to a pixel at the intersection of a data electrode and one of the scanning electrodes of a display panel, a reference Tw shows a select period for selection of a pixel and Ts is a non-select period. In the non-select period Ts, a bias voltage is applied to the pixel in a waveform having an amplitude of $\pm V1$. In the select period, opposite driving pulses D are applied to the pixel. The driving pulse D comprises a lower driving voltage of $\pm V2$ and higher driving voltage of $\pm V3$. The half tone of the picture is decided by the ratio of the period of time for the higher voltage $\pm V3$ to the period of time for the lower voltage $\pm V2$. However, in such a driving system, crosstalk occurs in the picture on the display panel, as described hereinafter in detail.

FIG. 3 shows a matrix arrangement of data electrodes S1 to Sn and scanning electrodes T1 to Tm for a liquid crystal display panel. FIG. 4a shows a driving voltage waveform applied to a scanning electrode T2, for driving pixels 100 and 102 of FIG. 3. FIGS. 4b and 4c show driving voltage waveforms applied to data electrodes S2 and S3. Capacitance connections between the scanning electrode T2 and data electrodes S2 and S3 noise which produce spike-shaped noise components 1 to 18 in the waveforms as shown in FIGS. 4a to 4c.

Noise components 1, 3, 5, 7, 9, and 11 are formed due to noise induced in the scanning electrode T2 by voltage variations of the waveform for the data electrode S2 shown in FIG. 4b. Noise components 2, 4, 6, 8, 10, and 12 are formed by voltage variations of the waveform of FIG. 4c for the data electrode S3. On the other hand, components 13 to 18 are formed in the waveforms for the data electrodes S2 and S3 by voltage variations in the waveform for the scanning electrode T2.

FIG. 4d shows a waveform for driving the pixel 100, which is the difference between the voltage waveforms of FIGS. 4a and 4b. FIG. 4e shows a driving vaveform for the pixel 102, which is formed by the difference between voltage waveforms of FIGS. 4a and 4c. It will be seen that the pulse of the higher voltage $\pm V3$ for determining the tone is formed by the leading edge of the selection pulse S in the waveform for the scanning electrode and the leading edge of the pulse P of the waveform for the data electrode shown in FIG. 4b (4c). In the waveform of FIG. 4d, the effective value of the pulse of the higher voltage $\pm V3$ is reduced to a smaller than optimum effective value shown by a dotted line. To the contrary, the effective value of the pulse of the higher voltage in the waveform of FIG. 4e becomes larger than an optimum effective value shown by a dotted line. The deviation of the effective value from the optimum effective value is integrated, which causes large crosstalk.

SUMMARY OF THE INVENTION

The object of the present invention is to provide a liquid crystal display panel driving system which may reduce crosstalk.

According to the present invention, there is provided a system for driving a liquid crystal display panel having a plurality of scanning electrodes and data electrodes arranged in a matrix, in which the half tone of a picture at each pixel at each intersection of the electrodes is decided by the ratio of a period of time of a high voltage portion in a driving pulse applied to the pixel to a period of time of a low voltage portion in the driving pulse. The system comprises first means for alternately applying first driving pulses to a selected scanning electrode in a first select period and second driving pulses in a second select period after the first select period, second means for applying third driving pulses to a data electrode so as to overlap with the first and second driving pulses to form a high voltage portion and a low voltage portion in the first driving pulse and in the second driving pulse respectively, and third means for forming the high voltage portion of the first driving pulse along a leading edge of the pulse and for forming the high voltage portion of the second driving pulse along a trailing edge of the pulse.

In an aspect of the invention, the third means includes a pulse width modulator responsive to picture data signals for changing the position of an edge of each third driving pulse so as to vary the width of the high voltage portion.

These and other objects and features of the present invention will become more apparent from the following description with reference to the accompanying drawings.

DETAILED DESCRIPTION OF THE PREFERRED EMBODIMENTS

Figure 1:
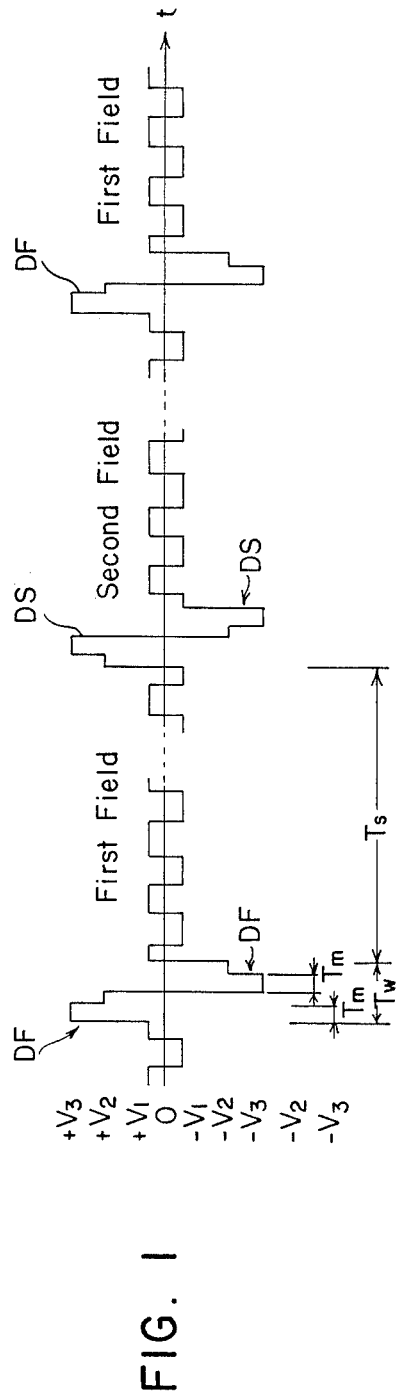
FIG. 1 shows a driving voltage waveform according to the present invention.
Figure 2:
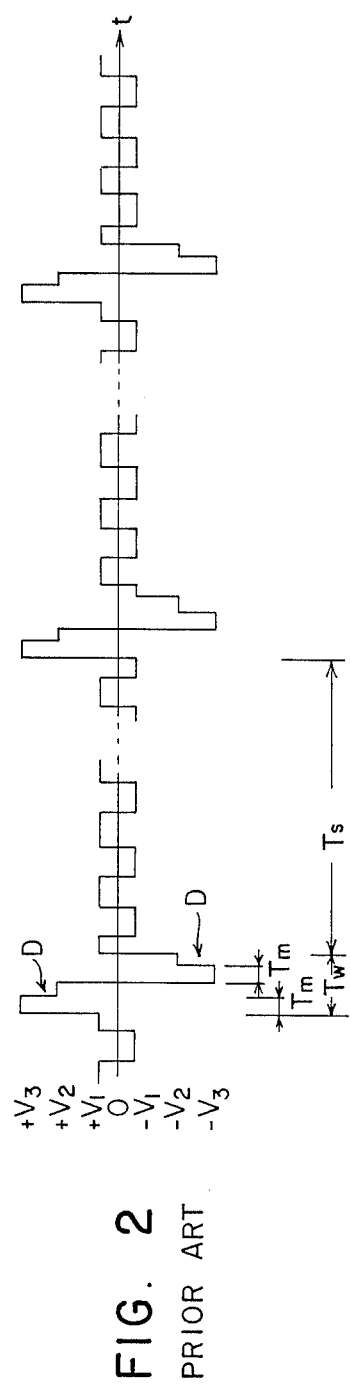
FIG. 2 shows a driving voltage waveform in a conventional system.

Referring to FIG. 1 showing waveforms including first and second driving pulses DF and DS for driving a pixel, the period Tm of the higher voltage $\pm V3$ for determining the tone in the first field is decided by changing the pulse width with reference to the leading edge of the first driving pulse DF. To the contrary, the period Tm in the second field is decided with reference to the trailing edge of the second driving pulse DS. Thus, the pixel is driven at a cycle over two fields.

Figure 3:
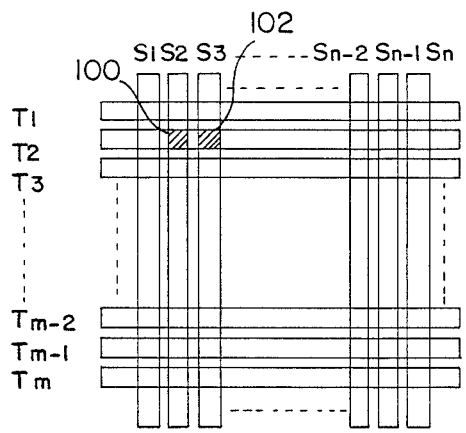
FIG. 3 shows a matrix arrangement of electrodes for a display panel.
Figure 4A:
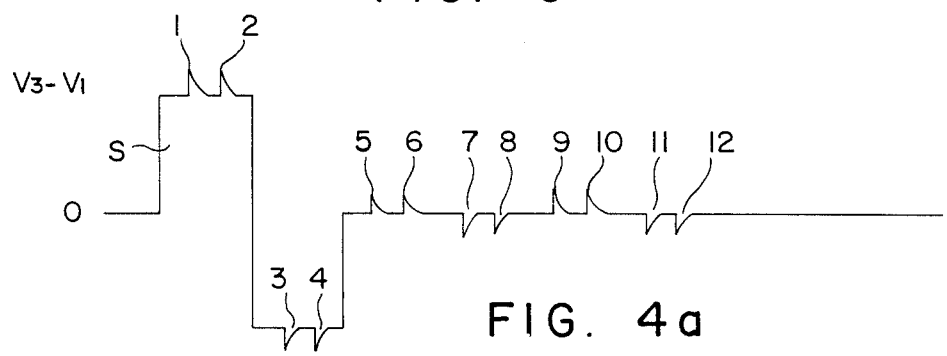
FIGS. 4a to 4e show various waveforms in the conventional system.
Figure 4B:
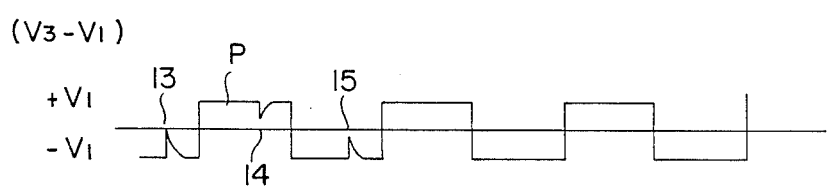
Figure 4C:
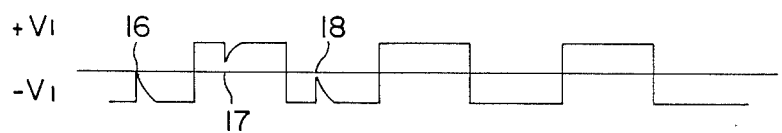
Figure 4D:
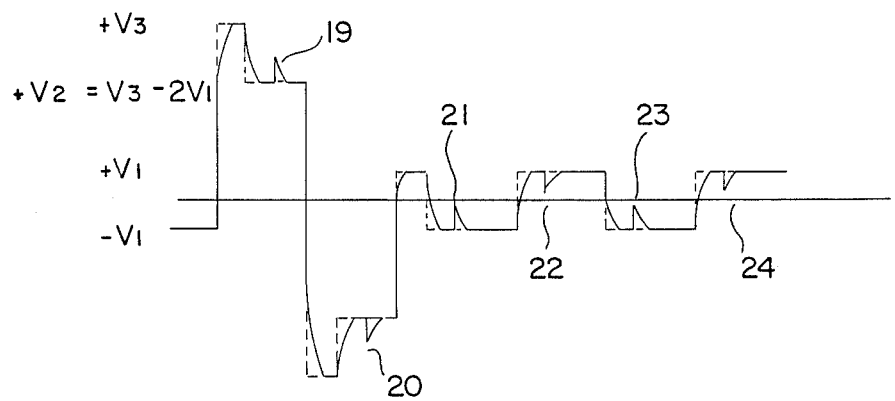
Figure 4E:
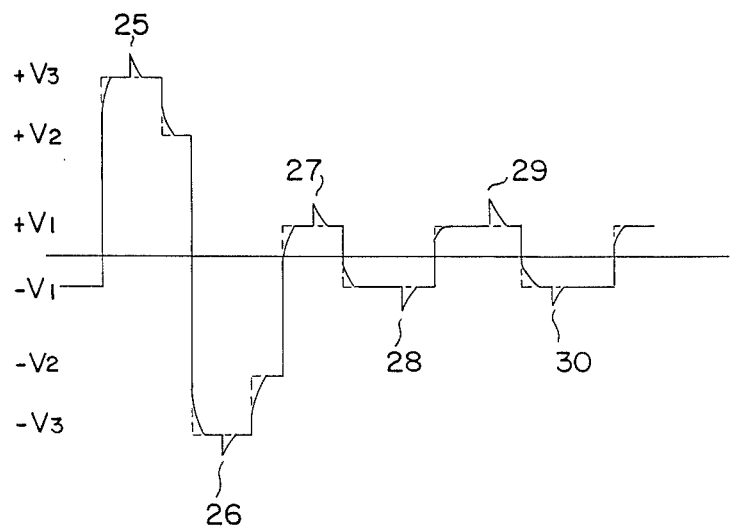
Figure 5A:
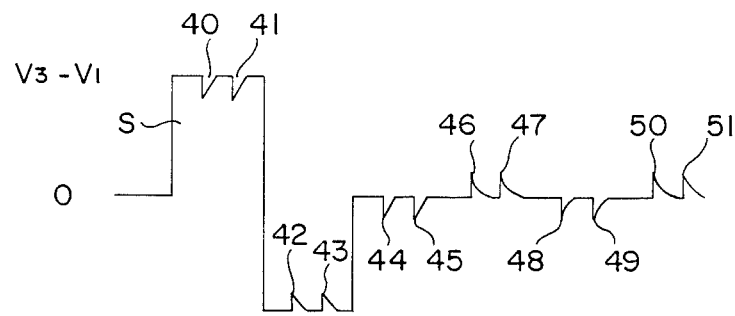
FIGS. 5a to 5e show various waveformes in a system of the present invention.
Figure 5B:
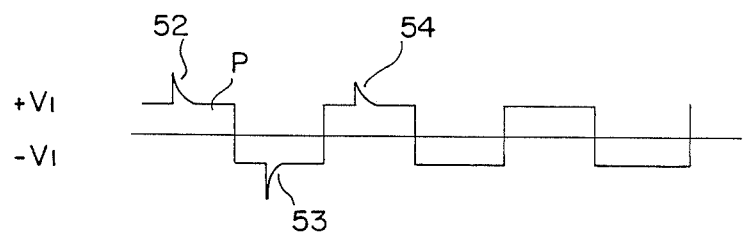
Figure 5C:
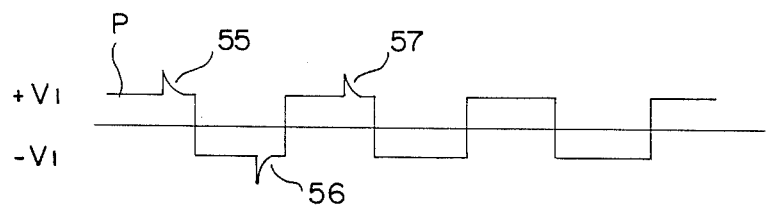
Figure 5D:
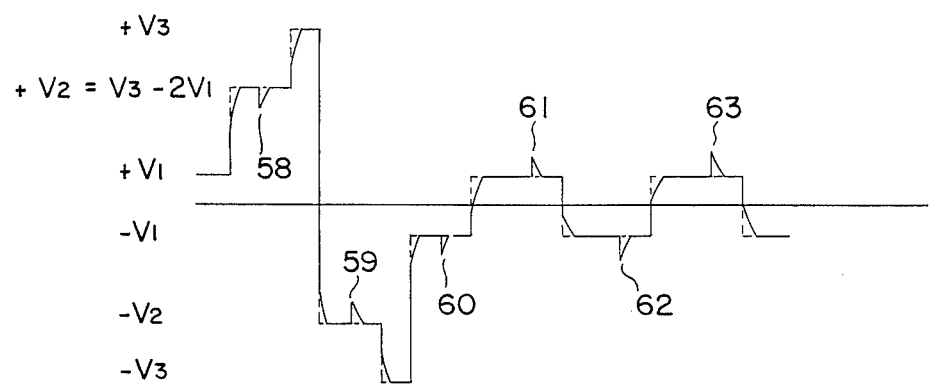
Figure 5E:
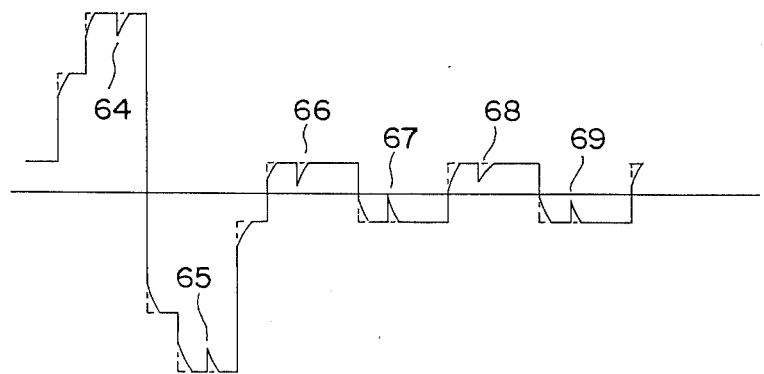

FIG. 5a shows a waveform for the scanning electrode T2 in FIG. 3 and FIGS. 5b and 5c are waveforms for data electrodes S2 and S3. Although these figures correspond to FIGS. 4a to 4e, phases between selection pulses S and pulses P are different from those of FIGS. 4a to 4c. FIGS. 5d and 5e show driving voltage waveforms applied to pixels 100 and 102. Although noise components are formed in the waveforms of FIGS. 5d and 5e for the same reason as FIGS. 4d and 4e, noise components are formed in the opposite direction to FIGS. 4d and 4e. For example, noise components 58 to 63 of FIG. 5d, which have influences on the effective value of the driving pulses, are reverse to components 19 to 24 of FIG. 4d. Accordingly, by alternately applying first and second driving pulses of FIG. 4d and FIG. 5d to the pixel at a predetermined cycle, the deviation of the effective value of the driving pulses from the optimum effective value is offset, thereby reducing the crosstalk.

Figure 6:
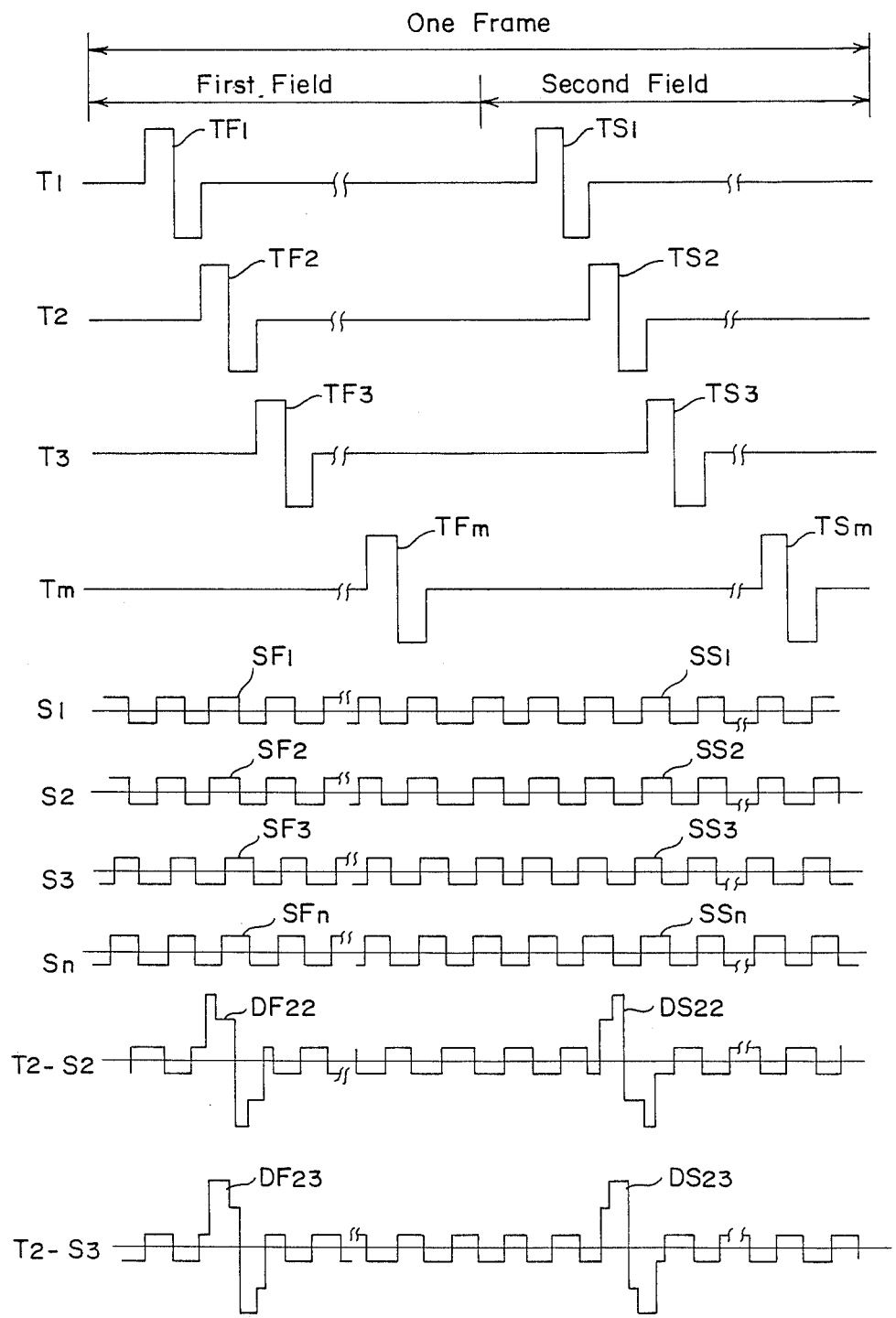
FIG. 6 shows driving voltage waveforms in the system of the present invention.

FIG. 6 shows various waveforms in the system of the present invention. During the first field, scanning electrode first driving pulses $TF_1, TF_2 \ldots TF_m$, each taking the form of an alternate pulse train, are applied to the scanning electrodes $T_1, T_2 \ldots T_m$ of FIG. 3, and during the second field, scanning electrode second driving pulses $TS_1, TS_2 \ldots TS_m$ are applied to the same scanning electrodes $T_1, T_2 \ldots T_m$, in sequence. Second pulse TS is the same as the first pulse TF in characteristic, and both pulses on one electrode are applied at the same phase in both fields, respectively. During the first field, data electrode first driving pulse train $SF_1, SF_2 \ldots SF_n$, each forming an alternate pulse train, are applied to the data electrodes $S_1, S_2 \ldots S_n$ and during the second field, data electrode second driving pulses $SS_1, SS_2 \ldots SS_n$ are applied to the data electrodes $S_1, S_2 \ldots S_n$. Each pulse train of data electrode second driving pulses SS on one electrode is different in phase from the corresponding pulse train of data electrode first driving pulses SF. During the first field, pixel first driving pulses DF, each of which is formed in the form of an alternate pulse train as a voltage difference between first and second pulses TF and SF, are applied to the pixels, and during the second field, the pixel second driving pulse DS are applied to the corresponding pixels. In FIG. 6, pulses $DF_{22}$, $DS_{22}$, $DF_{23}$, and $DS_{23}$ for pixels 100 and 102 are described as an example. The pixel driving second pulses $DS_{22}$, $DS_{23}$ which have the waveforms shown in FIG. 5d and FIG. 5e are different in phase and waveform from the pixel driving first pulses $DF_{22}$, $DF_{23}$ which have the waveforms shown in FIG. 4d and FIG. 4e.

Figure 7:
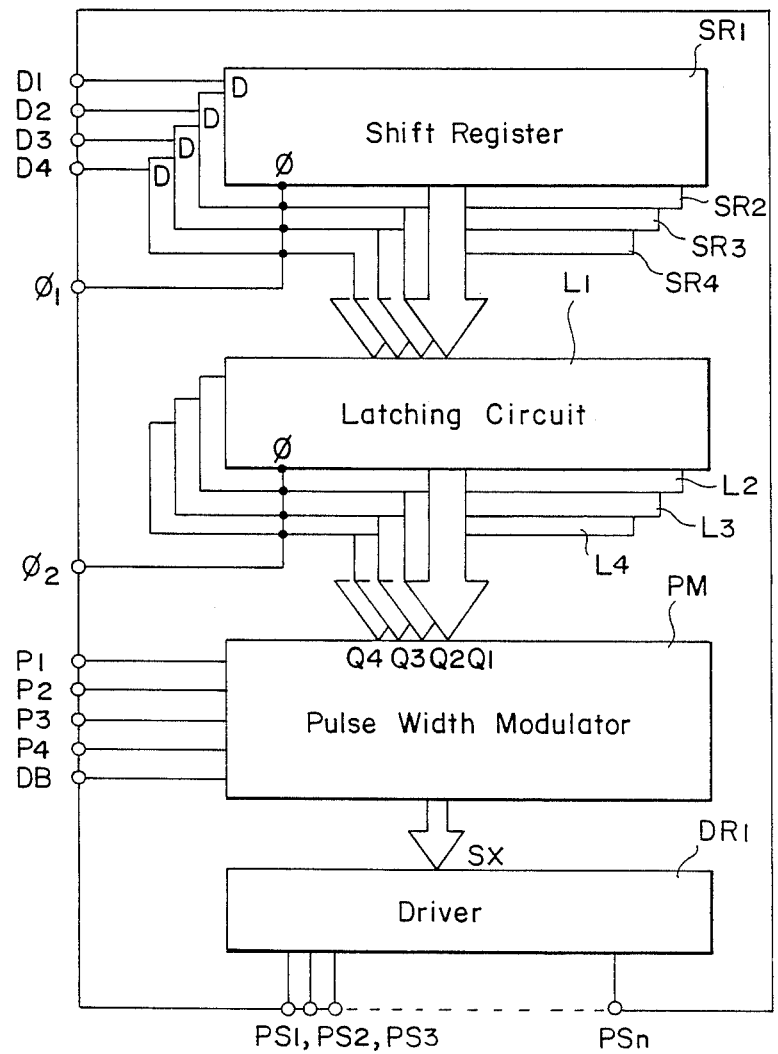
FIG. 7 is a block diagram of a circuit for driving data electrodes.
Figure 8:
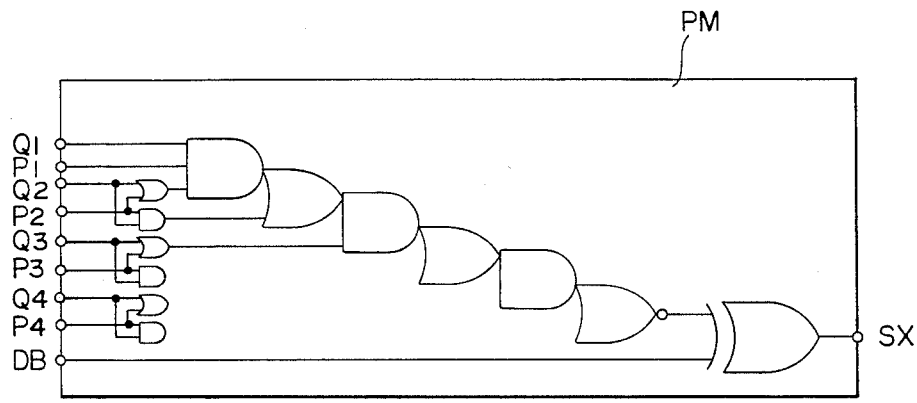
FIG. 8 shows a pulse width modulator.

FIG. 7 is a block diagram of a data electrode driving integrated circuit. The integrated circuit includes four shift registers SR1 to SR4, each of which is applied with one to four-bit picture data signals applied at terminals D1 to D4, for producing parallel four-bit picture data signals in response to clock pulses at input terminals $\phi 1$. The parallel picture data from the shift registers are latched in latching circuits L1 to L4 for a predetermined time in response to clock pulses at a terminal $\phi 2$. A pulse width modulator PM is provided for producing data electrode driving signals Sx in response to pulse forming signals at P1 to P4, DB shown in FIGS. 9a and 9b and to signals Q1 to Q4 from latching circuits L1 to L4. The pulse width modulator PM comprises a plurality of gate circuits corresponding to data electrodes S1 to Sn. FIG. 8 shows a gate circuit unit in the pulse width modulator PM. The signals Sx are applied to a driver DR1 which produces data electrode driving first and second pulses SF1 to SFn and SS1 to SSn at terminals PS1 to PSn for data electrodes S1 to Sn.

Figure 12:
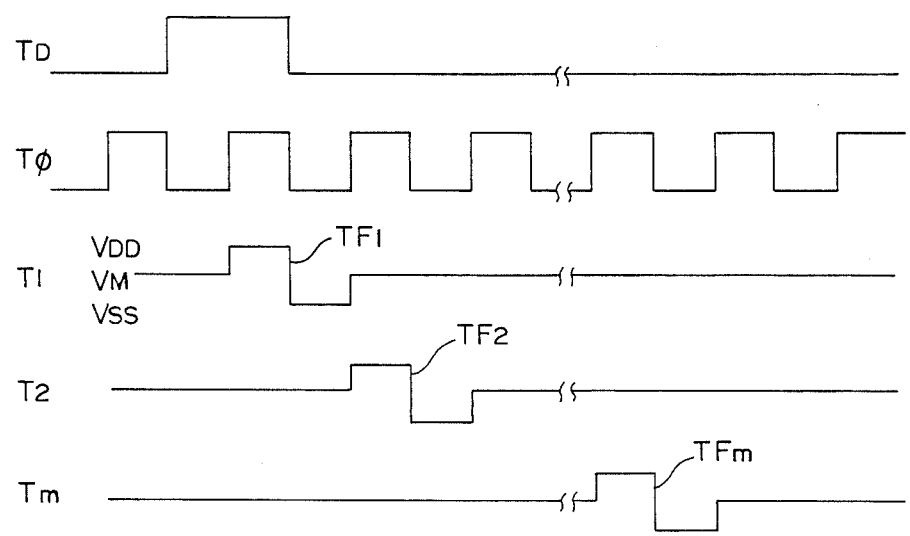
FIG. 12 shows various waveforms in the circuit of FIG. 10.
Figure 10:
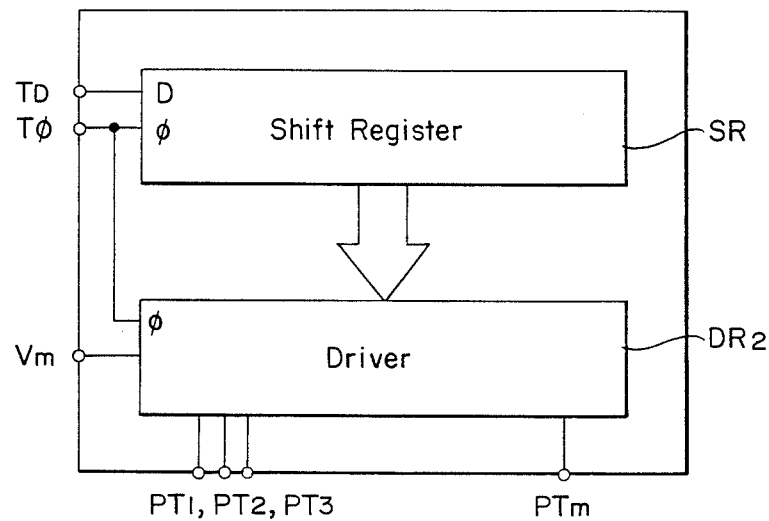
FIG. 10 is a block diagram of a circuit for driving scanning electrodes.
Figure 11:
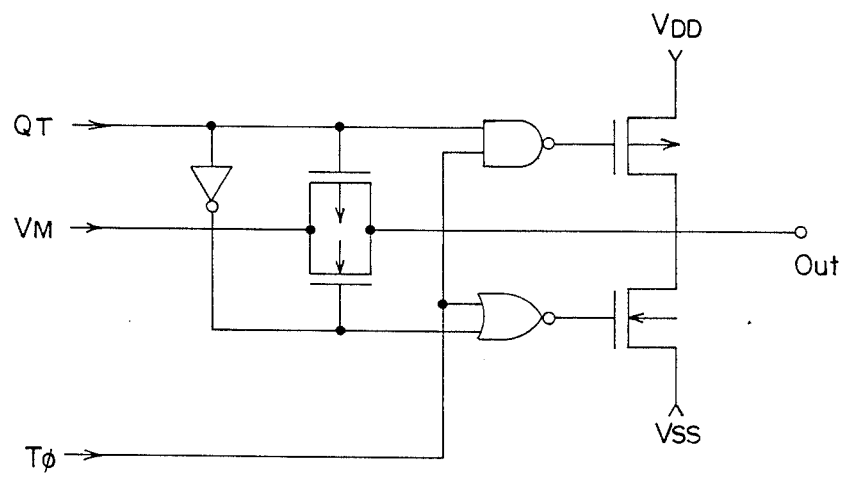
FIG. 11 shows a driver in the circuit of FIG. 10.

FIG. 10 shows a scanning electrode driving integrated circuit for producing waveforms T1 to Tm of FIG. 6. The circuit comprises a shift register SR and a driver DR2. The shift register SR produces an address signal in response to the clock pulses at a terminal $T\phi$ and a start signal at TD. The driver DR2 produces driving pulses at PT1 to PTm corresponding to waveforms T1 to Tm of FIG. 6 in response to the address signal and a signal at a terminal VM for applying a voltage for the non-select period. FIG. 11 shows a circuit unit of the driver DR2. The address signal from the shift register SR is applied to a terminal QT. Output voltage is produced at an output terminal OUT. In FIG. 12, waveform TD is the start signal at terminal TD of FIG. 10 and waveform $T\phi$ is the clock pulses at terminal $T\phi$ of FIG. 10. Waveforms T1 to Tm are outputs at output terminals of the driver DR2, which correspond to waveforms T1 to Tm of FIG. 6.

Figure 9A:
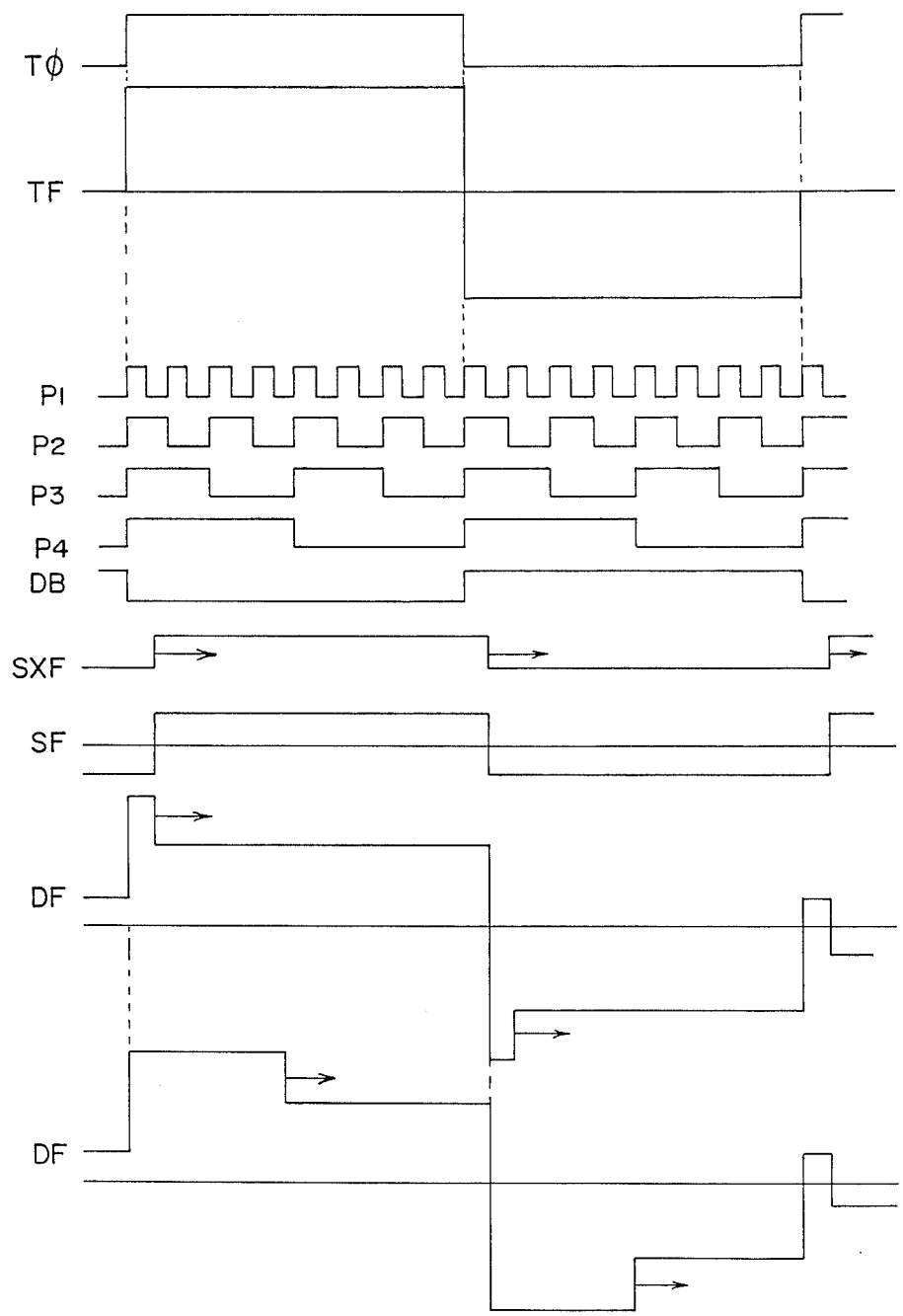
FIGS. 9a and 9b show various waveforms.
Figure 9B:
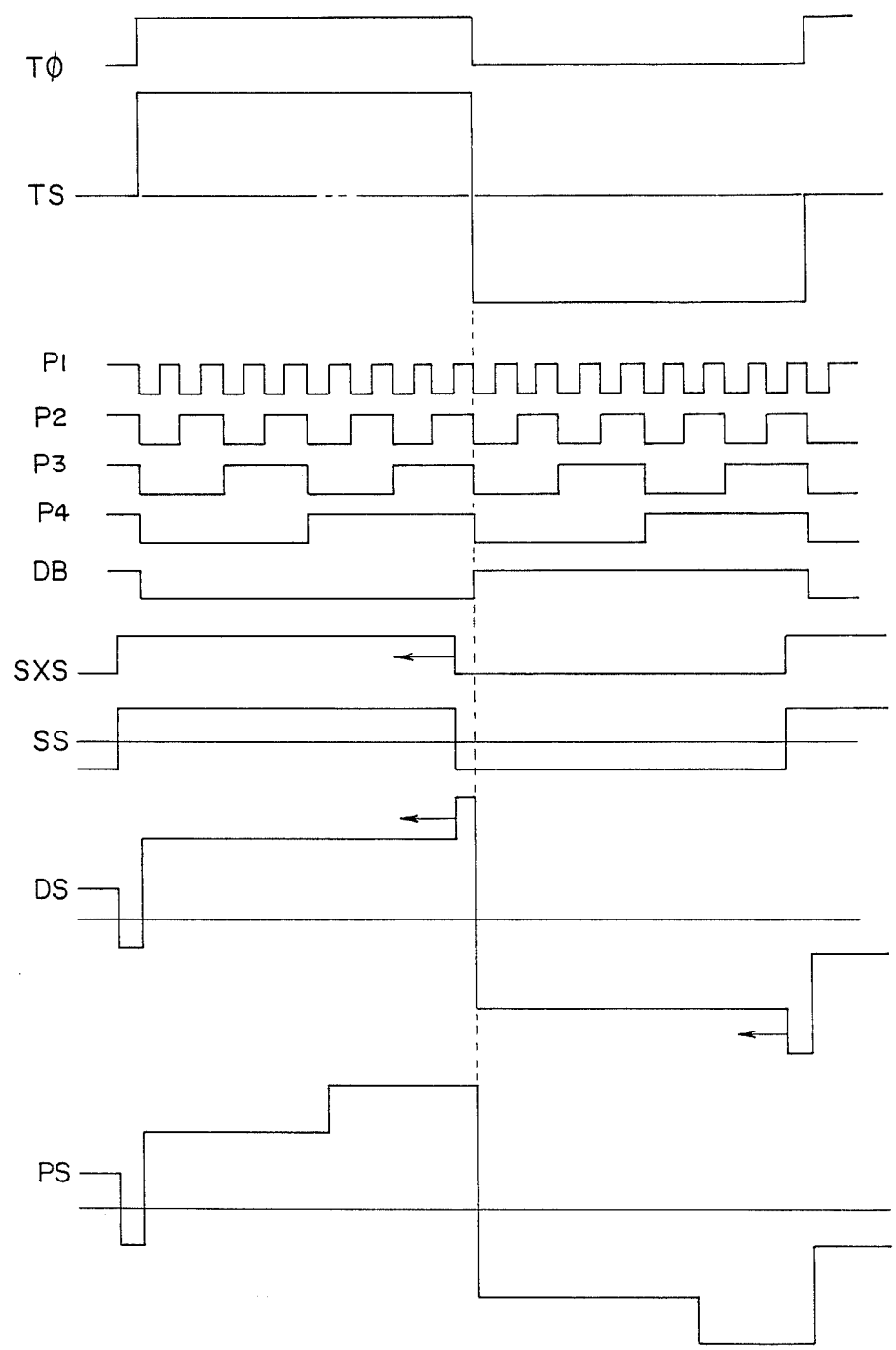

FIG. 9a shows the formation of the pixel first driving pulse TF for the first field and FIG. 9b shows the formation of the pixel second driving pulse TS for the second field. In FIG. 9a, pulses $T\phi$ ($\phi = 1, 2 \ldots m$) are scanning clock pulses which are applied to the scanning electrode driving integrated circuit shown in FIG. 10 so as to form the scanning electrode first and second driving pulses TF1, TF2 . . . TFm, TS1, TS2 . . . TSm. During the first field, pulse forming signals P1 to P4 and DB shown in FIG. 9a are applied to the gate circuit unit of the pulse width modulator PM shown in FIG. 8 so as to form data electrode first driving signals SXF for forming data electrode first driving pulses SF1 to SFn. In accordance with the data signals Q1, Q2, Q3 and Q4, the data electrode driving first signals SFX, namely data electrode driving first pulses SF (SF1 to SFn) are shifted in the right direction (as shown by the arrow) by an amount determined by Q1, Q2, Q3 and Q4 with respect to the leading edges of the clock pulses $T\phi$ ($\phi = 1, 2 \ldots M$), i.e. with respect to the leading edges of the scanning electrode driving first pulses TF (TF1, TF2 . . . TFm). Since each pixel driving first pulse DF is the potential difference between the scanning electrode first driving pulse and the data electrode first driving pulse, the resulting waveform of the pixel driving first pulse comprises a preceding high voltage portion ($\pm v_3$) along the leading edge of the scanning electrode driving pulse, having a width determined by given data signals Q1, Q2, Q3 and Q4, and a succeeding low voltage portion ($\pm v_2$) as shown at the lowermost portion of FIG. 9a.

During the second field, pulse forming signals P1 to P4 and DB shown in FIG. 9b are applied to the gate circuit unit of the pulsewidth modulator PM shown in FIG. 8 so as to form data electrode second driving signals SXS for forming data electrode second driving pulses SS1 to SSn. In accordance with the data signals Q1, Q2, Q3 and Q4, data electrode second driving signals SXS, and data electrode second driving pulses SS1 to SSn are shifted in the left direction (as shown by the arrow) by an amount determined by Q1, Q2, Q3 and Q4 with respect to the trailing edge of the clock pulses To, i.e. with respect to the trailing edge of the scanning electrode driving second pulses TS1, TS2 . . . TSm. Accordingly, the resulting waveform of the pixel driving second pulse comprises a preceding low voltage portion, and a succeeding high voltage portion along the trailing edge of the scanning electrode driving second pulses as shown at the lowermost portion of FIG. 9b.

While the invention has been described in conjunction with preferred specific embodiments thereof, it will be understood that this description is intended to illustrate and not limit the scope of the invention, which is defined by the following claims.

What is claimed is:

1. A system for driving a liquid crystal display panel having a plurality of scanning electrodes and data electrodes arranged in a matrix which are driven in accordance with address signals and picture data signals, picture elements being formed at intersections of said scanning and data electrodes, in which a half tone of a picture at each of said picture elements is determined by the ratio of a period of time of a high voltage portion of a driving pulse applied to said each picture element to a period of time of a low voltage of said driving pulse, the system comprising:

scanning electrode driving means responsive to said address signals for applying scanning electrode first driving pulses to selected scanning electrodes during a first field and for subsequently applying scanning electrode second driving pulses to the selected scanning electrodes during a second field;

data electrode driving means responsive to said picture data signals for applying data electrode first driving pulses to selected data electrodes during the first field which overlap with the scanning electrode first driving pulses so as to form picture element first driving pulses, each having a preceding high voltage portion and a succeeding low voltage portion, and for applying data electrode second driving pulses to said selected data electrodes during the second field which overlap with the scanning electrode second driving pulses so as to form picture element second driving pulses, each having a preceding low voltage portion and a succeding high voltage portion; and picture element driving pulse modulator means for forming the high voltage portion of each of said picture element first driving pulses along a leading edge of each of said scanning electrode first driving pulses, and for forming the high voltage portion of each of said picture element second driving pulses along a trailing edge of each of said scanning electrode second driving pulses.

2. The system according to claim 1 wherein said modulator means includes a pulse width modulator responsive to said picture data signals for changing the phase of said data electrode first and second driving pulses with respect to said scanning electrode first and second driving pulses so as to vary the width of the high voltage portion of a corresponding one of said picture element first and second driving pulses.

3. A system for driving a liquid crystal matrix display panel having a plurality of data electrodes and scanning electrodes arranged in a matrix, picture elements being formed at intersections of said data and scanning electrodes, comprising:

scanning electrode driver means for applying scanning driver pulses to said scanning electrodes;

data electrode driver means for applying data driver pulses to preselected data electrodes, including, means for applying first data driver pulses during a first field, and means for applying second data driver pulses during a second field;

said first data driver pulses combining with said scanning driver pulses to form first picture element driver pulses having a high amplitude portion at leading edges thereof and a lower amplitude portion at trailing edges thereof;

said second data driver pulses combining with said scanning driver pulses to form second picture element driver pulses having a high amplitude portion at trailing edges thereof and a lower amplitude portion at leading edges thereof;

the ratio of a high amplitude portion to a lower amplitude portion of a particular picture element driver pulse defining a half tone of a picture element to which said particular pulse is applied.

* * * * *